Jan. 21, 1958  D. GREGG  2,820,452
VALVE DEVICE
Filed Sept. 28, 1942

INVENTOR.
DAVID GREGG

BY David P. Moody
ATTORNEY

United States Patent Office 2,820,452
Patented Jan. 21, 1958

2,820,452

VALVE DEVICE

David Gregg, Caldwell, N. J., assignor to Bendix Aviation Corporation, South Bend, Ind., a corporation of Delaware Application September 28, 1942, Serial No. 460,007

23 Claims. (Cl. 128—1)

This invention relates to pressure control systems, and particularly to the control of the relief pressure in a system intended to have a variable relief pressure depending upon certain conditions of centrifugal force or acceleration.

It is well known that an aircraft pilot may suffer loss of consciousness in flight due to the existence of unusual accelerations encountered under certain flight conditions. Particularly, it is common knowledge that in the recovery from a power dive or any steep dive, excessive accelerational or centrifugal forces will be imposed upon the pilot's body, and when he is seated in normal attitude, the blood is drained from his brain, causing "blackout," and forced into his stomach and abdominal blood vessels, which readily accept this blood. It has been found that the "blackout" stage can be retarded or prevented by increasing the pressure around the stomach and abdominal blood vessels so that drainage from the brain to these vessels cannot occur.

Inflatable girdles or belts have been designed for use by pilots, and prior to the start of a dive, a pilot inflates the belt with air from a pressure bottle or from a pump, causing the belt to tightly embrace his midsection during the dive and the subsequent pull-out.

It is an object of the present invention to provide a pressure regulating valve for use with an inflatable girdle that will control the girdle pressure in accordance with certain accelerational or centrifugal forces.

It is another object of the invention to provide a relief pressure valve that will control the relief pressure in a pressure line in accordance with centrifugal or accelerational forces encountered in certain flight conditions of an aircraft as upon recovery of the aircraft from a diving maneuver.

A further object of the invention is the provision, in combination with an inflatable girdle and a source of pressure, of a relief valve that will vary the relief pressure in the girdle automatically in accordance with varying forces to which the valve may be subjected.

Other objects will appear from a study of the following specification when made in conjunction with the attached drawings, throughout which like numerals designate like parts.

Figure 1:
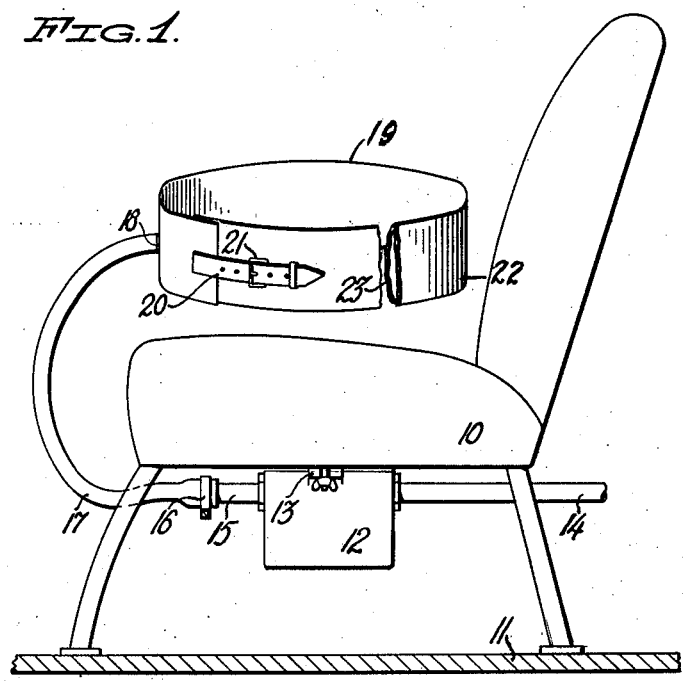
Figure 2:
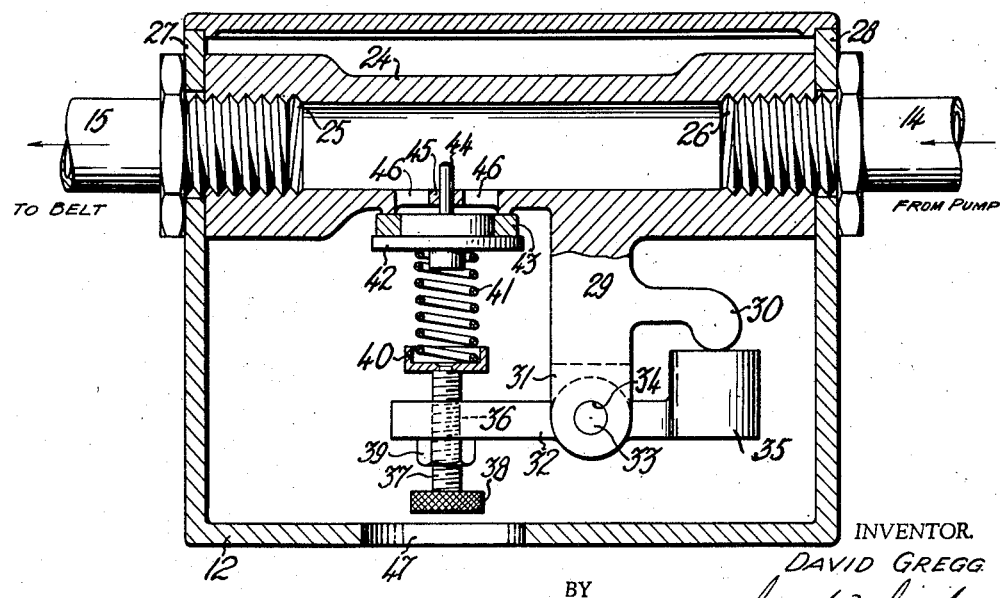

Fig. 1 is a side elevational view of a pilot's seat and an inflatable girdle showing the disposition of a relief valve which is the subject of the present invention; and Fig. 2 is a longitudinal, sectional view of the relief valve of the present invention.

By means of the relief valve of the present invention, the pilot of an aircraft is relieved of the necessity of consciously inflating the girdle used to place pressure on his stomach and abdomen prior to the beginning of a dive, the pressure being gradually applied, automatically in accordance with the accelerational or centrifugal forces being applied to his body and to the craft when the craft is swinging on a curve as when pulling out of a dive.

Having reference to the drawing, Fig. 1 shows a pilot's seat 10, which is fixed in the usual manner to the floor 11 of the cockpit of an aircraft. A housing 12, which is secured to the under surface of seat 10, by means of lugs and wing bolts 13, has a conduit or pressure line 14 extending into it from a pump (not shown), and another conduit 15, extending from the opposite face of housing 12, is connected by means of a clamp 16 to a flexible hose or tube 17. Tube 17 is fixed at its upper end 18 to an inflatable belt or girdle 19 having a conventional fastening device, such as an adjustable strap 20 and buckle 21. This belt is intended to encircle the waist of a pilot and includes a relatively rigid outside wall 22, which may be of leather or the like, and a flexible interior wall 23, which may be of rubber or the like. Walls 22 and 23 may be joined by an air-tight connection.

Within housing 12, as shown in Fig. 2, there is a conduit or pipe 24, forming a fluid passageway through housing 12, having screw threads 25 and 26 at opposite ends thereof. The pipe 24 terminates at the end walls 27 and 28 of housing 12, and is threaded to the conduits 14 and 15, respectively, with a fluid-tight connection. Pipe 24 has an integral depending arm 29 carrying a stop portion 30 and two aligned lugs 31, to which is pivoted a link member 32 by means of trunnions 33 carried in bores 34 of the lugs 31. One end of link 32 carries an enlarged, weighted portion 35, while the other end of link 32 has a threaded bore 36 extending between the two parallel faces thereof. An adjusting screw 37, having a head member 38, is threaded through bore 36, and is maintained in any given position by means of a lock nut 39. A cup-shaped member 40 is mounted by means of a rivet to the upper end of adjusting screw 37, and this member affords a bearing surface for one end of a helical spring 41, which terminates at its other end against a disc-like backing plate 42 of a valve member 43. Valve member 43 carries a guiding rod 44, which projects through a valve rod guide formed in hub 45 within pipe 24. A series of ports or valve openings 46 is formed about the hub member 45.

Housing 12 is provided with an aperture 47 located beneath adjusting head 38, so that adjustment of screw 37 may be facilitated. Aperture 47 also permits cockpit pressure to be communicated to the interior of housing 12.

The pump for supplying air under pressure through conduit 14 may be engine-driven, and therefore, in constant operation. Valve 43 may be adjusted by manipulation of the head 38 so that an initial pressure of about 1½ lbs. per square inch above cockpit pressure may be maintained within belt 19. The pilot may comfortably wear the belt 19 with this pressure during steady flight. It will be noted from the alignment of the valve housing that with flight from right to left of the sheet as shown in Figs. 1 and 2, then any downward or outwardly directed centrifugal or accelerational force will cause weight 35 to be swung about trunnions 33 in a clockwise direction, compressing spring 41, increasing the pressure of valve 43 against conduit 24, which results in an increased pressure within conduit 24 and within belt 19. Weight 35 and spring 41 may be so related that the relief pressure of valve 43 will increase at an approximate rate of ½ lb. per square inch per "g," where "g" equals the accelerational constant of 32.22 feet per second.

It will thus be apparent that as the "g" value increases during the pull-out stage of a dive, weight 35 will tend to move clockwise about trunnions 33 at a constantly increasing momentum, and thus, the relief pressure of valve 43 will be accordingly increased so that at the values of "g" that are physiologically critical, for example, from 6 to 9 "g," the pressure within belt 19 will have increased above cockpit pressure to approximately 3 to 4½ lbs. When the pull-out from the dive is complete, and normal straight flight is resumed, then the relief pressure of valve 43 is automatically restored to the initial value of 1½ lbs. per square inch.

Stop member 30 is provided to prevent counterclockwise motion of weight 35, and also to enable the initial pressure to be adjusted to the value desired, since the tendency of spring 41, when in compression, will be to rotate weight 35 in a counter-clockwise direction.

Further it will be seen that under certain other accelerational conditions, as during the leveling off of an aircraft after a rapid rise, or ascension, the weight 35 will tend to move in a counterclockwise direction about trunnions 33 against arm 30 so as to render itself ineffective relative to the force of the spring 41. Thus under such conditions the valve 43 will be held in closed position solely under the biasing force of the spring 41, unaffected by the weight 35 and the accelerational forces acting thereon. The latter action will cause a relatively low pressure to be applied within the belt 19 and around the stomach and abdominal region of the body during recovery of the aircraft from an ascending maneuver so as not to cause a deleterious effect upon the pilot.

While only one embodiment of the present invention has been shown in the drawing, it is to be understood that various changes may be made without departing from the scope of the present invention. For this reason, it is intended not to limit the invention by the description herein given as an example, but solely by the scope of the appended claims.

What is claimed is:

1. In combination with a chair, an inflatable girdle to be worn by the occupant of said chair, a pressure line for transmitting fluid pressure to said girdle, a valve member for regulating the fluid pressure in said girdle comprising a housing secured to said chair, a fluid passageway therethrough, a valve port in the wall of said passageway, a relief valve within said housing but externally of said passageway, spring means urging said valve to close said port, an arm projecting from said passageway, a link pivoted to said arm, said link having two ends, said spring means being seated at one end, and a weight located at the other end, whereby, upon acceleration of said chair in certain directions, said weight will move about the pivotal point of said arm to increase the pressure of said spring means against said relief valve to increase the pressure at which fluid in said passageway and said girdle will be relieved.

2. In an aircraft, a mechanism for regulating the relief pressure in a line of said aircraft under fluid pressure, comprising a fluid conduit carried by said aircraft, said conduit for connection to said pressure line, a valve port opening into said conduit, a relief valve seated upon said port, axially compressible spring means for urging said valve against said port so that said port will be closed thereby until the pressure of fluid in said conduit reaches a selected value, and means connected to said spring means and responsive to centrifugal forces applied upon said aircraft pulling out of a dive so as to increase the axially exerted pressure of said spring to increase the relief pressure in said conduit in accordance with said centrifugal forces.

3. A mechanism for regulating the relief pressure in a line under fluid pressure, comprising a conduit for connection in said line, a valve port in said conduit, a relief valve seated on said port, a pivoted arm spaced from said valve and having an adjusting screw at one end thereof and a weight at the other end thereof, an axially compressible helical spring having one end abutting said valve and another end carried by said adjusting screw, the pressure of said spring against said valve being controllable through said adjusting screw, said pivoted arm being rotatable in one direction under the influence of said weight due to accelerational forces of certain character so that the axially exerted force of said spring against said valve may be increased to increase the relief pressure in said conduit, and engaging means for limiting the movement of said weight in another direction upon accelerational forces of certain other character acting upon said weight, whereby said relief valve may be acted upon solely by the biasing force of said spring free of the biasing force of said weight.

4. In an aircraft, a mechanism for regulating the relief pressure in a line of said aircraft under fluid pressure, comprising a conduit carried by said aircraft, said conduit for connection in said line under pressure, a valve port in said conduit, a relief valve mounted adjacent said port for seating thereon, spring means acting in an axial direction to urge said valve against said port to prevent escape of fluid under a determined pressure value, and means including a movable mass responsive to centrifugal force effective when the aircraft is pulling out of a dive for acting through said spring to increase the relief pressure at said valve port during the latter conditions of flight of said aircraft.

5. A device of the character described, comprising, in combination, fluid pressure means for applying a force at the abdominal region of the body of an occupant of an aircraft, control valve means for varying the force applied by said fluid pressure means, and a movable mass for operating said control means in response to centrifugal force effective during the recovery of the aircraft from a diving maneuver.

6. A device of the character described, comprising, in combination, a fluid pressure responsive member for applying a force at the abdominal region of the body of an occupant of an aircraft, control valve means for varying the force applied by said fluid pressure responsive member, and means including a weighted member for operating said control valve means in response to changes in centrifugal force effected during maneuvers of said aircraft.

7. An aircraft mechanism for regulating the relief pressure in a line under fluid pressure, comprising, in combination, a conduit for connection in said line under pressure, a valve port in said conduit, a relief valve mounted adjacent said port for seating thereon, spring means biasing said valve at a first pressure value against said port to prevent escape of fluid under a determined pressure value, means including a weight movable in one direction and so arranged as to act through said spring means in such a manner as to increase the relief valve pressure at said valve port to a second pressure value during certain accelerational conditions of flight of said aircraft, and other means so arranged as to limit the movement of said weight in another direction, whereby said relief valve may be held solely by the biasing force of said spring means at said first pressure value during certain other accelerational conditions of flight of said aircraft.

8. The combination comprising first means to be worn about a portion of the body of an occupant of an aircraft, said first means for applying a variable force to the abdominal portion of the body of said occupant, a relief valve regulating said variable force, second means arranged for regulating by said relief valve the force applied by said first means, said second means including acceleration responsive means subject to change in the acceleration of said aircraft, said acceleration responsive means arranged to automatically operate said relief valve in such a manner as to cause a relative increase in the force applied to said abdominal portion of the body by said first means during recovery of said aircraft from a diving maneuver and a relative decrease in such force during recovery of said aircraft from an ascending maneuver.

9. The combination comprising constricting means to be worn about a portion of the body of an occupant of an aircraft, a conduit for conducting a continuous flow of fluid medium under pressure to operate said constricting means, means for regulating the flow and thereby the pressure of the fluid medium in said conduit, means responsive to centrifugal force for controlling the flow regulating means and thereby the pressure of said fluid medium so as to increase the constricting force applied by said constricting means upon flight of said aircraft along a curved path during recovery from a diving maneuver, said constricting means being adapted to be positionable about the body of the occupant to retard upon such increase in the constricting force thereof the drainage of blood from the brain of the occupant, whereby the occupant may be protected from loss of consciousness.

10. The combination comprising constricting means to be worn about a portion of the body of an occupant of an aircraft, a conduit for conducting a fluid medium under pressure to operate said constricting means, pressure relief valve means responsive to centrifugal force for regulating the pressure of said fluid medium so as to increase the constricting force applied by said constricting means upon flight of said aircraft along a curved path during recovery from a diving maneuver, said constricting means being adapted to be positionable about the body of the occupant to retard upon such increase in the constricting force thereof the drainage of blood from the brain of the occupant, whereby the occupant may be protected from loss of consciousness.

11. An aircraft mechanism for regulating the relief pressure in a line under fluid pressure, comprising, in combination, a conduit for connection in said line under pressure, a valve port in said conduit, a relief valve mounted adjacent said port for seating thereon, spring means biasing said valve at a first pressure value against said port to prevent escape of fluid when the fluid pressure is below a predetermined value, means including a weight movable in one direction and so arranged as to act through said spring means in such a manner as to increase the relief valve pressure at said valve port in response to centrifugal force resulting during certain conditions of flight of said aircraft, and other means so arranged as to limit the movement of said weight in an opposite direction, whereby said relief valve may be held solely by the biasing force of said spring means at said first pressure value during certain other conditions of flight of said aircraft.

12. A valve mechanism for regulating fluid pressure in a pressure line of an aircraft, comprising, a fluid conduit adapted to be connected into said pressure line, a valve port opening into said conduit, a relief valve seated upon said port, spring means for urging said relief valve against said port so that said port will be closed thereby until the pressure of the fluid in said conduit exceeds a selected value, and means connected to said spring means and responsive to centrifugal forces applied upon said aircraft pulling out of a drive for acting through said spring means so as to increase the relief pressure in accordance with said centrifugal forces.

13. A valve mechanism for use in controlling an inflatable constricting means to be worn about a portion of the body of an occupant of an aircraft, comprising valve means, means adapted to connect the valve means in a fluid pressure line for inflating the constricting means, said valve means for controlling the inflating pressure, and means including a weighted member for operating said control valve means so as to increase the inflating pressure and thereby the constricting force applied by said constricting means in response to centrifugal force effective during flight of the aircraft along the curved path of an inside loop.

14. A device for use in controlling an inflatable constricting means to be worn about a portion of the body of an occupant of an aircraft, comprising means for controlling a continuous flow of a fluid medium under pressure to operate said constricting means, means for adjusting said flow control means to vary the operating pressure of said fluid medium, and acceleration responsive means to operate said flow control adjusting means so as to increase the pressure to be applied by said constricting means during recovery of the aircraft from a driving maneuver or during flight of the aircraft along the curved path of an inside loop.

15. In combination with a chair adapted to be mounted on an aircraft, an inflatable girdle to be worn by the occupant of said chair, a relief valve set to regulate the inflation of said girdle, and means responsive to acceleration of said chair so as to overcome said relief valve setting and increase the pressure to which said girdle is inflated during recovery of the aircraft from a diving maneuver or during flight of the aircraft along the curved path of an inside loop.

16. In a system for preventing an unnatural blood distribution within a human body which is subjected to forces set up when said body is accelerated in space, means adapted normally to engage loosely a portion of the human body and adapted, when actuated, to effect a pressure against the blood-carrying vessels of said body, a control valve automatically operative in response to said acceleration forces to render said means effective and automatically operative upon the cessation of said acceleration forces to render said means ineffective to enable the means to return to its normal condition, and means to vary the intensity of the pressure exerted by said first mentioned means in a ratio proportional to the magnitude of said acceleration forces.

17. An anti-blackout device for aviators including an aviator's pressurizeable wearing apparel, a source of fluid under pressure, valve means automatically operable under an increase of g for controlling and maintaining a portion of said fluid under pressure, proportional to the increase of g to thereby effect the effective flow of fluid to and into said wearing apparel, said valve means including a weighted valve normally discharging substantially all of the fluid under pressure from said source to a point outside of said apparel, and operable under an increase of g, to control the effective flow of fluid under pressure into said pressurizeable wearing apparel.

18. An anti-blackout device for aviators including an aviator's pressurizeable wearing apparel, a source of fluid under pressure, valve means automatically operable under an increase of g for controlling and maintaining a portion of said fluid under pressure, proportional to the increase of g to thereby effect the effective flow of fluid to and into said wearing apparel, said valve means including a spring loaded valve normally discharging substantially all of said fluid under pressure from said source, and operable under a desired minimum increase of g, to control the effective flow of fluid under pressure into said pressurizeable wearing apparel.

19. An anti-blackout device for aviators including an aviator's pressurizeable wearing apparel, a source of fluid under pressure, valve means automatically operable under an increase of g for controlling and maintaining a portion of said fluid under pressure, proportional to the increase of g to thereby effect the effective flow of fluid to and into said wearing apparel, means connecting said pressurizeable wearing apparel to said valve means, said valve means including a spring loaded weighted valve normally connecting the fluid from said source to an exhaust, and operable under an increase of g, to control the effective flow of fluid under pressure into said pressurizeable wearing apparel connecting means.

20. For use with an anti-blackout device for aviators of the type including an aviator's pressurizeable wearing apparel, and a pressure line for connecting said wearing apparel to a source of fluid under pressure; the combination with said fluid pressure line of a valve means, normally operative to discharge substantially all of said fluid under pressure to a point outside of said wearing apparel, said valve means including a weighted member automatically operable in response to an increase of g to control said valve means so as to maintain the discharge of the fluid under pressure inversely proportional to the increase of g.

21. An anti-blackout device for aviators including an aviator's pressurizeable wearing apparel, a source of fluid under pressure, fluid pressure conduit means for connecting said wearing apparel to said source of fluid under pressure, and acceleration responsive valve means connected into said conduit means for automatically controlling the effective flow of fluid under pressure from said source to and into said wearing apparel, said valve means being normally operative to discharge substantially all of the effective flow of said fluid under pressure to a point outside said wearing apparel, and operable under an increase of acceleration to direct the effective flow of fluid under pressure into said wearing apparel in proportion to the increase of acceleration.

22. An anti-blackout device for aviators including an aviator's pressurizeable wearing apparel, a source of fluid under pressure, fluid pressure conduit means for connecting said wearing apparel to said source of fluid pressure, and valve means connected into said conduit means for automatically controlling the effective flow of fluid under pressure from said source to and into said wearing apparel, said valve means including acceleration responsive means normally operative to discharge substantially all of the effective flow of fluid under pressure to a point outside said wearing apparel, and operable under an increase of acceleration to direct the effective flow of fluid pressure into said wearing apparel in proportion to the increase of acceleration.

23. The combination comprising constricting means to be worn about a portion of the body of an occupant of an aircraft, a conduit for conducting a continuous flow of fluid medium under pressure to operate said constricting means, means for regulating the flow and thereby the pressure of the fluid medium in said conduit, acceleration responsive means for controlling the flow regulating means and thereby the pressure of said fluid medium so as to increase the constricting force applied by said constricting means during recovery of said aircraft from a diving maneuver, and said constricting means arranged to be positioned about the body of the occupant in such a manner as to retard upon such increase in the constricting force thereof the drainage of blood from the brain of the occupant, whereby during the interval of recovery of the aircraft from said diving maneuver the occupant may be protected from loss of consciousness.

References Cited in the file of this patent

UNITED STATES PATENTS

| | | |
|---|---|---|
| 635,801 | McLean | Oct. 31, 1899 |
| 764,877 | Anderson | July 12, 1904 |
| 1,667,055 | Sloan | Apr. 24, 1928 |
| 2,104,758 | Poppen | Jan. 11, 1938 |
| 2,163,731 | Hallot | June 27, 1939 |
| 2,249,579 | Rea | July 15, 1941 |
| 2,676,586 | Coakwell | Apr. 27, 1954 |

FOREIGN PATENTS

| | | |
|---|---|---|
| 2,897 | Great Britain | Sept. 19, 1868 |
| 4,175 | Great Britain | Dec. 19, 1873 |